United States Patent [19]

Cherukuri et al.

[11] Patent Number: 5,023,093

[45] Date of Patent: * Jun. 11, 1991

[54] REDUCED CALORIE CHEWING GUM BASE AND COMPOSITIONS CONTAINING THE SAME

[75] Inventors: Subraman R. Cherukuri, Towaco, N.J.; Gul Mansukhani, Staten Island, N.Y.

[73] Assignee: Warner-Lambert Company, Morris Plains, N.J.

[*] Notice: The portion of the term of this patent subsequent to Oct. 10, 2006 has been disclaimed.

[21] Appl. No.: 451,277

[22] Filed: Dec. 14, 1989

Related U.S. Application Data

[63] Continuation-in-part of Ser. No. 292,283, Dec. 30, 1988, and Ser. No. 377,800, Jul. 7, 1989, which is a continuation-in-part of Ser. No. 939,918, Dec. 10, 1986.

[51] Int. Cl.$^5$ .............................................. A23G 3/30
[52] U.S. Cl. .......................................... 426/3; 426/5; 426/548; 426/804; 426/307; 426/103
[58] Field of Search ........................................ 426/3–6, 426/548, 804, 307, 103

[56] References Cited

U.S. PATENT DOCUMENTS

| | | | |
|---|---|---|---|
| 4,241,091 | 12/1980 | Stoz et al. | 426/4 |
| 4,252,830 | 2/1981 | Kehoe et al. | 426/3 |
| 4,357,354 | 11/1982 | Kehoe et al. | 426/3 |
| 4,357,355 | 11/1982 | Koch et al. | 426/4 |
| 4,387,108 | 6/1983 | Koch et al. | 426/4 |
| 4,452,820 | 6/1984 | D'Amelia | 426/3 |
| 4,518,615 | 5/1985 | Cherukuri et al. | 426/4 |
| 4,872,884 | 10/1989 | Cherukuri et al. | 426/3 |

*Primary Examiner*—Jeanette Hunter
*Attorney, Agent, or Firm*—Daniel A. Scola, Jr.; Craig M. Bell

[57] ABSTRACT

A chewing gum base composition containing elastomer polyvinyl acetate having a medium molecular weight of about 35,000 to 50,000; acetylated monoglyceride; fat having a melting point below about 65°C.; and remaining amounts of filler material; a chewing gum composition containing the same; and an extended flavor release gum product.

68 Claims, No Drawings

REDUCED CALORIE CHEWING GUM BASE AND COMPOSITIONS CONTAINING THE SAME

BACKGROUND OF THE INVENTION

This application is a continuation-in-part of U.S. application Ser. No. 07/292,283, filed Dec. 30, 1988 and U.S. application Ser. No. 07/377,800 filed July 7, 1989 both of which are continuation-in-part applications of U.S. application Ser. No. 939,918, filed Dec. 10, 1986.

1. Field of the Invention

The present invention relates to a chewing gum base and more particularly to chewing gum base compositions containing a low melting point fat which when used in a chewing gum composition has a reduced calorie content and exhibits an enhanced hydrophilic nature. The invention also relates to a confectionery coated chewing gum composition and a chewing gum composition having extended flavor release.

2. Description of the Prior Art

To reduce calories in chewing gum it is often necessary to replace the soluble sugar and/or sugar alcohol bulking agents with low calorie alternatives. The soluble sugar and sugar alcohol bulking agents not only impart necessary sweetness but also a discontinuity to the gum base which results in a softer, more pleasant chew and mouth feel.

Most reduced or light calorie chewing gum compositions generally contain about 25% by weight of a water-insoluble gum base, inert fillers or texturizing agents in amounts of at least 40% by weight up to 90% or more, a water-soluble flavoring agent and water-soluble sweeteners such as sucrose and corn syrup or in sugarless gum sorbitol, mannitol and artificial sweeteners. Also incorporated within the gum base may be plasticizers or softeners to improve consistency and texture of the gum.

The gum base of known reduced or light calorie chewing gum generally contains a natural rubber gum, a synthetic rubber gum and mixtures thereof. When synthetic gum bases are utilized, the preferred elastomer component has been the styrene-butadiene copolymer (SBR). Gum base is noncaloric and insoluble. A chewing gum composition high in gum base content may also thus be reduced in calories.

Previous attempts to produce high gum base content, low calorie, chewing gum compositions have resulted in products with a hard, tight, rubbery chew and poor texture.

Reduced calories, low calorie, and no calorie chewing gum compositions are well know. Prior attempts to produce a reduced calorie chewing gum composition have relied on high levels of inert fillers or texturizing agents to replace the sugars and sugar alcohols used as both bulking and sweetening agents in conventional chewing gums.

Klose, et al. U.S. Pat. No. 4,382,963, disclose a sugar-free, low calorie chewing gum utilizing spray-dried polydextrose as the bulking agent wherein from 65% to 85% by weight polydextrose is incorporated into the gum base to form a sugar-free, unsweetened, chewing gum with a caloric content of less than one calorie per gram.

Keho, et al U.S. Pat. Nos. 4,252,830 and 4,357,354 disclose a substantially calorie-free chewing gum base which includes gum base containing high levels of inert fillers, such as calcium carbonate or talc in amounts of about 50% to about 85% and about 40% to about 95% by weight respectively. The chewable gum base includes at least 10% air voids entrapped in the gum base matrix which, upon chewing, becomes filled with moisture causing air increase in bolus volume.

Stroz, et al. U.S. Pat. No. 4,241,091 disclose a substantially calorie-free sweetener, containing from 1 to 15% by weight alpha-cellulose and from 1 to about 40% by weight water. The chewing gum of Stroz, et al., has a high bolus volume.

Published U.K. Patent application No. 2,159,384A discloses a no-calorie, noncariogenic chewing gum composition. The chewing gum composition comprises 92% to 99% by weight of a gum base, up to 4% glycerol and up to 3% of flavorings. The formulation was found to be substantially non-adhesive to the teeth, particularly to dental prostheses. This application disclosed a gum base containing an elastomer, hydrogenated or partially hydrogenated animal or vegetable oil, mineral filler, polyvinyl acetate, fatty acid glycerides, resins, natural gum and wax in specified amounts.

In the parent application, now U.S. Pat. No. 4,872,884, issued Oct. 10, 1989 a chewing gum base composition and gum composition prepared therefrom are disclosed. The base formulation contains elastomers, medium molecular weight polyvinyl acetate, acetylated monoglyceride, a wax having a melting point below about 60° and remainder base components.

While the prior art compositions have been effective to make reduced calorie chewing gums, most of these formulations have resulted in chewing gums having a hard chew or off taste or poor texture because of the use of high levels of fillers, and texturizing agents. It has been believed that the use of high levels of fillers and texturizers was essential to obtain a soft chew product.

It would therefore be desirable to develop a reduced calorie chewing gum that offers a reduction in caloric content without the use of high filler content.

In accordance with the present invention, a chewing gum base as well as a chewing gum composition has been discovered which have a reduced calorie content and an enhanced hydrophilic nature. This latter property enables the flavoring agent and sweetener to be released over a longer period of time during chewing without formation of a rubbery or tight chew. It appears that as the gum composition is chewed the gum base increases in size and apparently enables release of flavoring agent and sweetener which would normally be entrapped within the gum matrix while maintaining a soft chew texture. These properties are accomplished with a 30% to 50% reduction in calories in the chewing gum composition for both sugar and sugarless chewing gums.

This is an important aspect of this invention since a commonly noted deficiency in chewing gums remains the relatively rapid exhaustion of the flavor sensation during chewing. This deficiency is most pronounced since flavor loss frequently occurs within 3 to 7 minutes after chewing commences, and the flavor taste is significantly reduced thereafter. One of the causes of this loss is the general tendency for the bolus to retain large percentages of the flavor even during mastication. Thus for example, an average of 50-70% of the flavor ingredient added to a given gum composition during its formulation may remain trapped in the spent gum base.

Efforts to compensate for this reduced flavor sensation have included the addition of higher than normal amounts of flavor or sweetener to the formulation, and the preparation and use of flavors having controlled water solubility or other release characteristics, or the addition of sweeteners to extend the flavor sensation. None of the approaches broadly recited above, however, have succeeded in appreciably extending flavor release.

Generally, the flavor component regardless of how added to the gum composition is entrapped and retained by the gum base ingredients. This entrapment renders the flavor unavailable as discussed above. High base chewing gum compositions generally render a product having a hard chew and tend to retain more flavor than lower base-containing compositions, thereby having less flavor available for release during chew.

Efforts to arrest flavor entrapment in the gum base have focused on encapsulation techniques. Accordingly, flavors have been encapsulated in many of the same ingredients in the gum base toward which the flavors have exhibited affinity, such as the resin, elastomer and vinyl polymer components, as well as other suitable film formers and similar agents. The encapsulated flavors still suffer from the drawbacks and deficiencies of the prior art however, as a large quantity of the flavor is still retained by the base, and the release of the flavor from the encapsulating matrix is frequently incomplete.

A full discussion of the prior art with respect to the extension of flavor is found in Wei et al. U.S. Pat. No. 4,590,075, the disclosure of which is incorporated herein by reference. More particularly, the patentees discuss the prior art preparation of encapsulated flavors which are added together with a quantity of a non-confined hydrophobic flavor oil to a suspension agent before formulation in a chewing gum (Marmo et al. U.S. Pat. No. 3,920,849); the preparation of a flavor composite by crosslinking the flavor with a water-soluble hydrophilic polymer such as hydroxyethyl acrylate (U.S. Pat. No. 3,761,286); the preparation of microencapsulated flavor particles and their dispersion in a slurry on the surface of a chewing gum (U.S. Pat. No. 3,962,463). Further, Yang et al. U.S. Pat. No. 4,695,463 discloses a flavor delivery system that relies on the immobilization of the flavor within a crosslinked hydrocolloid multivalent alginate or carageenenate matrix.

An exception to the adoption of flavor fixation is found in Stroz, et al. U.S. Pat. No. 4,157,401, where a limonene derivative was introduced in combination with a quantity of unfixed flavor, on the basis that the limonene prevents the migration of the flavor to the water-soluble phase of the gum and resultingly, toward its premature release.

In view of the foregoing, a need therefore exists for the development of improved chewing gums particularly having high base content that are capable of offering extended flavor sensation in combination with improved shelf stability.

SUMMARY OF THE INVENTION

In accordance with the present invention, a chewing gum base as well as a chewing gum composition which has a reduced calorie content and an enhanced hydrophilic nature has been unexpectedly discovered. This latter property enables the flavoring agent and sweetener to be released over a longer period of time during chewing without formation of a rubbery or tight chew. It appears that as the gum composition is chewed the gum base increases in size and apparently enables the release of flavoring agent and sweetener which would normally be entrapped within the gum matrix while maintaining a soft chew texture. These properties are accomplished with a 30% to 50% reduction in calories in the chewing gum composition for both sugar and sugarless chewing gums.

A chewing gum composition is prepared in accordance with the present invention, that offers substantially improved and prolonged flavor release, along with other attributes in a high gum base system, by the use of a base formulation that yields a soft texture and chew at contents ranging from about 40% to about 90% by weight of the total gum composition. The invention also contemplates the use of a flavor component which may be employed in free or spray-dried form or may be encapsulated, and is incorporated into the gum base in amounts of up to about 4% by weight thereof, and more particularly, in amounts of from about 1% to about 3% by weight, with preferred amounts ranging from about 1.5% to about 2.2% by weight.

The present invention also pertains to a confectionery coated chewing gum composition having a center portion and a confectionery coating over the center portion wherein the center portion comprises a reduced-calorie gum base having an enhanced hydrophilic nature.

A particularly preferred embodiment of the invention involves the formation of a chewing gum base composition, which comprises:

a) about 0.5 to about 30% elastomer;

b) about 5% to about 40% of a polyvinyl acetate having a medium weight average molecular weight of about 35,000 to 44,000;

c) about 4.5% to about 15% acetylated monoglyceride;

d) about 6% to about 20% of fat having a melting point below about 65°; and e) remaining amounts of a material selected from the group consisting of elastomer solvent, emulsifiers, fillers and mixtures thereof; all percents are by weight of the final gum base composition and are present in amounts to bring the weight of gum base to 100%.

A further embodiment involves the formation of a confectionery coated chewing gum composition having a center portion and a confectionery coating over the center portion wherein the center portion comprises a reduced-calorie gum base which comprises in percentages by weight of the gum base:

(a) an elastomer present in an amount from about 0.5% to about 30%;

(b) a medium molecular weight polyvinyl acetate polymer having a molecular weight from about 35,000 to about 55,000 present in an amount from about 5% to about 40%;

(c) an acetylated monoglyceride present in an amount from about 4.5% to about 15%;

(d) a fat having a melting point below about 65% C. present in an amount from about 6% to about 20%; and (e) a component selected from the group consisting of elastomer solvents, emulsifiers, optional plasticizers, fillers, and mixtures thereof, all present in an amount to bring the total amount of gum base to 100%.

Another embodiment involves a method for preparing a confectionery coated chewing gum composition having a center portion and a confectionery coating over the center portion, which comprises, coating the center portion with the confectionery coating and wherein the center portion comprises a gum base having an enhanced hydrophilic nature.

Another further embodiment involves the formation of a chewing gum composition capable of releasing increased amounts of flavor evenly over a longer release time using conventional flavor levels comprising:

(a) a gum base present in an amount of from about 40% to about 90% by weight;

(b) a carbohydrate component present in an amount of from about 7% to about 45% by weight; and (c) a flavor component present in an amount of up to about 4% by weight.

DETAILED DESCRIPTION OF THE INVENTION

The present invention provides a chewing gum base composition and chewing gum composition containing the same which is initially soft and chewable, has reduced calorie content and a desirable prolonged sweetness release rate. The chewing gum composition of the invention will have a calorie content of less than about two-thirds and preferably less than 50% of that of conventional sugar containing and sugarless containing chewing gums with comparable sweeteners.

As used in the specification and claims, the term "reduced calorie" shall mean having a calorie content two thirds or less than that of conventional chewing gum. The term "tight" or "rubbery" chew refers to a chewing gum composition which upon chewing requires a large amount of muscular chewing effort to masticate the formulation or one that provides a difficult to deform gum bolus with high elasticity and bounce.

The elastomers useful in the present gum base composition include styrene-butadiene rubber (SBR) and those non-styrene-butadiene rubber (non-SBR) elastomers normally included in gum base. Illustrative elastomers include SBR, synthetic gums or elastomers such as polyisobutylene and isobutylene-isoprene copolymers; natural gums or elastomers such as chicle, natural rubber, jelutong, balata, guttapercha, lechi caspi, sorva or mixtures thereof. Among these polyisobutylene, isobutylene-isoprene copolymer or mixtures thereof alone or with SBR are preferred.

The elastomer content of the gum base is generally employed in an amount of about 0.5% to about 30% and preferably about 2.5% to about 15% by weight of the gum base. When the total amount of elastomer is below 0.5% the base composition lacks elasticity, chewing texture, and cohesiveness whereas at amounts above about 30% the formulation is hard, rubbery and maintains a tight chew.

Polyvinyl acetate (PVA) is an essential ingredient in the chewing gum base compositions of this invention. More particularly it is essential to employ a medium molecular weight variety having a mean average molecular weight of about 35,000 to about 55,000. Such material will have a preferred viscosity of 35 to 55 seconds (ASTM designation D1200-82 using a Ford cup viscometer procedure.) This medium molecular weight component is used in amounts of about 5% to about 40% by weight of the gum base and preferably from about 8% to about 15% by weight. It has also been found that the use of a blend of low molecular weight PVA and medium molecular weight PVA may be employed. Normally the low molecular weight material has molecular weight of about 12,000 to about 16,000 mean average molecular weight. Such material will have a preferred viscosity of 14 to 16 seconds (ASTM D1200-82 using a Ford cup viscosity procedure). This low molecular weight component is used in amounts up to about 15% by weight of the gum base and preferably from about 12% to about 17% by weight.

When both the low and medium molecular weight PVA components are employed they must be present in a particular mole ratio of 1:0.5 to 1.5, respectively. Lower amounts of low molecular weight component result in compositions that are tight. Higher amounts of low molecular weight component form compositions that lack elasticity.

As an optional component, it is possible to employ small amounts of high molecular weight PVA in combination with the medium molecular weight component. The high molecular weight PVA may be used in amounts up to about 15% and preferably from about 2 to about 15% by weight of the base and has a mean average molecular weight of 65,000 to 95,000.

In addition to the critical PVA constituent, it has been found essential to employ acetylated monoglycerides as a plasticizing agent. While the sponification value of the acetylated monoglycerides is not critical, useable compounds include materials having sponification values of 278 to 292, 316 to 331, 370 to 380, and 430 to 470. A particularly preferred form has a sponification value above about 400. Such compounds generally have a percent acetylation above 90%, a hydroxyl value below 10 and a Reichert Meissl value above 150 (Food Chemical Codex (FCC) III/P508 and the revision of AOCS).

The use of acetylated monoglyceride results in a plasticized gum base that may be formed without use of known bitter PVA plasticizers, namely triacetin. The acetylated monoglycerides of this invention are used in amounts of about 4.5% to about 15% and preferably about 5% to about 10%.

The gum base formulation must employ a fat material. The fats have been found to soften the polymer elastomer mixture and improve elasticity of the chew character. The fats employed must have a melting point below about 65° and preferably between about 30° and about 65°. Useful amounts are from about 6% to about 20% by weight and preferably from about 5% to about 12% by weight of the gum base composition. The use of such low melting point fats in the gum base of this invention has been unexpectedly found not to create a tacky product which is contrary to normal belief.

Particularly preferred fats include the hydrogenated vegetable oils such as hydrogenated palm oil, hydrogenated soybean oil, hydrogenated cotton seed oil and various other hydrogenated vegetable oils and mixtures thereof.

In addition to the foregoing essential ingredients, the gum base compositions of this invention include a variety of traditional ingredients, such as elastomer solvent, emulsifiers, optional additional plasticizers, fillers and mixtures thereof.

The gum base composition elastomer solvents aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, terpene resins including polyterpene and polymers of alpha-pinene or beta-pinene and mixtures thereof. The elastomer solvent may be employed in an amount ranging from about 2% to about 12% and preferably about 7% to about 11% by weight of the gum base. Amounts below about 2% cause unacceptable chew characteristics. Amounts above 12% cause a soft product to be formed.

Useful optional emulsifiers in the gum base compositions of this invention include glycerol monostearate, lecithin, fatty acid monoglycerides, diglycerides, propylene glycol monostearate and mixtures thereof. When emulsifiers are absent, the formulation has poor stability and lacks acceptable texture. It is believed that the emulsifier aids in bringing the normal immiscible constituents together in such a way that they form a single finely dispersed stable system. In addition the emulsifier improves the hydrophilic character of the formulations. The emulsifier is employed in amounts of about 2% to about 10% and preferably about 4% to about 8% by weight of the base. It has been found that some emulsifiers conventionally used result in the formation of unacceptable base formulations. Non-preferred emulsifiers include glyceryl triacetate.

A variety of traditional ingredients such as optional additional plasticizers or softeners may be employed. Such materials are optional and not essential in the present formulations. Such materials include lanolin, stearic acid, sodium stearate, potassium stearate, glycerine and the like and mixtures thereof. Such materials when incorporated into the gum base result in a variety of desirable textures and consistency properties. These individual materials are generally employed in amounts of about 6% to about 20% by weight and preferably in amounts of from about 9% to about 17% by weight of the gum base composition. Because of the low molecular weight of these compounds, they are able to penetrate the fundamental structure of the base making it plastic and less viscous.

Bulking agents, such as fillers may also be employed in the gum base. Illustrative bulking agents include calcium carbonate, talc, aluminum hydroxide, alumina, aluminum silicates, calcium phosphates (anhydrous and dihydrate) and combinations thereof. Preferably the amount of filler when used will vary from about 15% to about 40% by weight of the gum base and most preferable 20% to 30%. Use of amounts above about 40% result in a soft product that disintegrates upon chewing whereas amounts below about 15% form chewing gum products that are rubber or tight.

Once the gum base is prepared it is ready for blending into a chewing gum composition.

The manner in which the base constituents are blended is not critical and is performed using standard techniques and equipment known to those skilled in the art. In a typical embodiment the elastomer composition is agitated with an elastomer solvent and fats, and/or emulsifiers for a period of about 1 minute to about 30 minutes. Once initial mixing is complete the PVA component is blended into the first mixture. While it is not essential it is preferred to add the medium molecular weight PVA prior to addition of the optional low or high molecular weight component. In this manner uniform blending can be achieved without the creation of isolated pockets of PVA within the elastomer. The remaining base constituents may now be added in bulk, incrementally or stepwise while the resulting mixture is blended for a further equivalent period of time.

The present gum base may be formulated into a wide variety of chewing gum products utilizing standard procedures and equipment. A chewing gum composition may be prepared by combining conventional ingredients such as sweeteners, flavors, colorants and the like.

The amount of gum base employed will vary depending on such factors as the type of base used, consistency desired and other components used to make the final product. In general, amounts from about 40% to 90% by weight of the final composition are acceptable with preferred amounts of about 60% to about 70% by weight being usable.

As indicated above, the gum base composition may be used in sugar and sugarless containing chewing gums to prepare a reduced calorie containing product. In addition, the chewing gum may be anhydrous, substantially anhydrous or prepared to be moisture containing.

The unique combination of components used to prepare the gum base of this invention enables the gum base to be employed at higher than normal levels to achieve a reduced calorie product by concurrent reduction in the amount of sweetener employed. It is well known that the calories and cariogenic properties of chewing gums are primarily contributed by the sweetening agents, both sugar and sugarless. By preparing a gum base which does not need high levels of sweetener to plasticize the base and render it soft during chewing it is possible to employ higher levels of the noncaloric base in place of the sweetening agent. This increase can be achieved without the need for increasing filler content to that which would be normally present and thus avoids the formation of rubbery or tight chew products.

The sweetening agent used in the chewing gum compositions may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides, and polysaccharides such as xylose, ribose, glucose, mannose, galactose, fructose, dextrose, sucrose, sugar maltose, partially hydrolyzed starch, or corn syrup solids and sugar alcohols such as sorbitol, xylitol, mannitol, maltitol and mixtures thereof.

B. Water-soluble artificial sweeteners such as the soluble saccharin salts, i.e., sodium or calcium saccharin salts, cyclamate salts, acesulfame-K and the like, and the free acid form of saccharin, chlorinated derivatives of sucrose such as chlorodeoxysucrose and the like, and protein based sweeteners, such as Thaumatin (talin).

C. Dipeptide based sweeteners such as L-aspartyl-L-phenylalanine methyl ester and materials described in Alitame U.S. Pat. No. 3,492,131, and the like.

In general, the amount of sweetener will vary with the sweetener used and desired amount of sweetener selected for a particular chewing gum. This amount will normally vary from about 0.001% to about 60% by weight when using an easily extractable sweetener. The water-soluble sweeteners described in category A above, are preferably used in amounts of about 25% to about 60% by weight and most preferably about 10% to about 30% by weight. In contrast, the artificial sweetener-described in categories B and C are used in amounts of about 0.005% to about 5.0% and most preferably about 0.05% to about 2.5% by weight of the final gum composition. These amounts are ordinarily necessary to achieve a desired level of sweetness independent from the flavor level achieved from the flavoring agents.

Flavoring agents well known in the chewing gum art may be added to the chewing gum compositions of the instant invention. These flavoring agents may be chosen from synthetic flavoring liquid and/or oils derived from plants leaves, flowers, fruits and so forth, and combinations thereof. Representative flavoring liquids include: spearmint oil, cinnamon oil, oil of wintergreen (methylsalicylate) and peppermint oils. Also useful are artificial, natural or synthetic fruit flavors such as citrus oil including lemon, orange, banana, grape, lime, apricot and grapefruit and fruit essences including apple, strawberry, cherry, orange, pineapple and so forth; bean and nut derived flavors such as coffee, cocoa, cola, peanut, almond and so forth.

The amount of flavoring agent employed is normally a matter of preference subject to such factors as flavor type, base type and strength desired. In general, amounts up to about 4% by weight and preferably about 0.05% to about 3.0% by weight of the final chewing gum composition are usable with amounts of about 0.8% to about 1.5% being preferred.

The chewing gum formulations are prepared by conventional methods. An illustrative process involves first melting the gum base at a temperature from about 70° C. to about 120° C. and mixing the gum base in a kettle with a liquid softener and/or an emulsifier for 2 to 8 minutes. To this mixture ⅔ to ¾ of the sweetener ingredient and colors are added and mixing is continued for 1 to 4 minutes. To this mixture the remaining sweetener ingredients are added and while mixing is continued, the flavoring agent is slowly added. Mixing is maintained for 1 to 4 minutes. To this mixture a humectant can be added and mixing is continued for 1 to 4 minutes. The gum is discharged from the kettle and formed into its desired shape such as strips, slabs, chunks, ball ropes and/or center filled.

The chewing gum composition of this invention may additionally include the conventional additives of coloring agents such as titanium dioxide; emulsifiers such as lechithin and glyceryl monostearate; and fillers such as dicalcium phosphate, aluminum hydroxide, and combinations thereof. The total amount of fillers present is generally up to about 10% by weight.

In a preferred embodiment, the invention is directed to a method for preparing a center portion in a confectionery coated chewing gum composition having a confectionery coating over the center portion, wherein the center portion is comprised of a chewing gum composition, which comprises the steps of (1) providing the following ingredients of the chewing gum composition, which comprises (a) an elastomer present in the amount from about 0.5% to about 20%, by weight of the gum base, (b) a medium molecular weight polyvinyl acetate polymer having a molecular weight from about 35,000 to about 55,000 present in an amount from about 5% to about 40%, by weight of the gum base, (c) an acctylated monoglyceride present in an amount from about 4.5% to about 15%, by weight of the gum base, (d) a fat having a melting point below about 65° C. present in an amount from about 6% to about 20%, by weight of the gum base, and (e) a material selected from the group consisting of elastomer solvents, emulsifiers, optimal plasticizers, fillers, and mixtures thereof, present in an amount to bring the total amount of gum base to 100%, by weight of the gum base, and (B) a bulking agent present in an amount up to about 60%, by weight of the chewing gum composition, and (2) admixing the ingredients in step (A) to form a uniform mixture, and (3) admixing the ingredients in step (B) to the mixture of step (2) to form a uniform mixture and finally coating the gum composition with a confectionery coating.

The present invention also relates to a chewing gum composition offering extended flavor release comprising:

(a) a gum base present in an amount of from about 40% to about 90% by weight;

(b) a carbohydrate component present in an amount of from about 7% to about 45% by weight; and (c) a flavor component present in an amount up to about 4% by weight.

This is accomplished by the combination of a gum base formulation exhibiting improved softness and flavor release and the incorporation into the gum base of a flavor component in an amount ranging up to about 4% by weight of the gum composition. The flavor component may be prepared in a variety of forms including spray-drying, encapsulation and free form, and the gum composition may contain a higher percentage of gum base and a relatively low percentage of water-soluble ingredients. The incorporation of the flavor into the high base composition has unexpectedly been found to more evenly stabilize and thereby extend flavor release, and overcomes the tendency of conventional chewing gum formulations with lower gum base concentrations to diminish in flavor intensity within five to seven minutes of chewing.

A secondary advantage of the chewing gum composition of the present invention is that the high percentage of chewing gum base exhibits improved plasticity and other desirable textural characteristics without the need for including additional texture modifying agents. While not wishing to be bound to any particular theory of operation, it is believed that the flavor when ultimately admixed with the gum base of the present invention further plasticizes the latter and thereby improves its properties, while the gum base releases the flavor with a more even, increased release rate to promote the extended flavor sensation.

The following examples are given to illustrate the invention, but are not deemed to be limiting thereof. All percentages given throughout the specification are based upon weight unless otherwise indicated. Percentages of base components are by weight of the base, whereas percentages of chewing gum composition components are by weight of the final chewing gum formulation.

EXAMPLE 1

Inventive Runs I to IV

This example demonstrates the formation of chewing gum base formulations according to the invention.

To a preheated kettle is added the elastomer which is mixed for 3 minutes under high shear until the mass reaches a temperature of 88° C. To this mass is added an elastomer solvent and mixing continued for 5 minutes. To this first mixture is added in sequence while mixing is continued the medium molecular weight PVA, low molecular weight PVA when used, fats, plasticizer and acetylated monoglyceride and remaining ingredients. The final mass is blended for about 30 minutes. The final temperature should range from 71° C. to 99° C. The molten mass is discharged from the kettle and put into coated pans. The base is allowed to cool and harden before depanning. The ingredients are recited in Table I.

TABLE I

| | Runs | | | |
|---|---|---|---|---|
| | I | II | III | IV |
| Polyisobutylene elastomer mixture | 8.5 | 8.5 | 8.5 | 8.5 |
| Polyvinylacetate | | | | |
| Low Molecular Weight | 6.0 | 6.0 | 6.0 | 6.0 |
| Medium Molecular Weight | 8.5 | 8.5 | 8.5 | 8.5 |
| Glyceryl ester of polymerized resin | 4.5 | 4.5 | 4.5 | 4.5 |
| Glyceryl ester of partially hydrogenated wood resin | 8.0 | 8.0 | 8.0 | 8.0 |
| Acetylated monoglyceride | 5.5 | 5.5 | 5.5 | 5.5 |
| Glyceryl monostearate | 7.5 | 7.5 | 7.5 | 7.5 |
| Partially hydrogenated Palm Oil (58–62° C.) | | | | 6.0 |
| Cotton Seed Oil (61–65° C.) | 6.00 | | | |
| Vegetable Oil (38–40° C.) | | 6.0 | | 6.0 |
| Hydrogenated vegetable oil (38–40° C.) | | | | |
| Hydrogenated cotton seed oil (63–67° C.) | 4.06 | 4.06 | 4.06 | 4.06 |
| Hydrogenated soybean oil (67–68°C.) | 5.00 | 5.00 | 5.00 | 5.00 |
| Filler | 36.44 | 36.44 | 36.44 | 36.44 |
| Total | 100% | 100% | 100% | 100% |

EXAMPLE 2

Inventive Runs V to VIII

This example demonstrates the formation of chewing gum compositions according to this invention using the base formulations of Example 1.

Chewing gum formulations are prepared with the ingredients recited in Tables I and II. The formulations were prepared by first melting the gum base of the Example 1 Runs at a temperature from 70° C. to 100° C. and mixing the gum base in a kettle with the sorbitol and mannitol. Mixing is continued for approximately 2 minutes to obtain a homogenous mixture. To this mixture is added the remaining ingredients of Table II and mixing continued for approximately 7 minutes.

The gum is discharged from the kettle and formed into chunks and conditioned to room temperature (24° C.).

In order to evaluate the chewing gum formulations, the four gum formulations were subjected to chew out test panel studies using multiple panelists. The results demonstrated that the chewing gum formulations of this invention exhibited consistent soft chew character and slow flavor release.

TABLE II

| Gum Base | 65.00 |
|---|---|
| Sorbitol | 21.97 |
| Mannitol | 4.26 |
| Liquid Flavor Mixture | 2.30 |
| Glycerin | 5.00 |
| Softener | 0.2 |
| Artificial Sweetener Mixture | 1.27 |
| Total | 100% |

The invention being thus described, it will be obvious that the same may be varied in many ways. Such variations are not to be regarded as a departure from the spirit and scope of the invention and all such modifications are intended to be included within the scope of the following claims.

We claim:

1. A chewing gum base composition, which consisting essentially of:
   a) about 0.5 to about 30% elastomer;
   b) about 5% to about 40% of a polyvinyl acetate having a medium molecular weight of about 35,000 to about 55,000;
   c) about 4.5% to about 15.0% acetylated monoglyceride;
   d) about 6% to about 20% of a fat having a melting point below about 65° C.; and
   e) remaining amounts of a filled material; all percents are by weight of the final gum base composition and are present to bring the weight of gum base to 100%.

2. The gum base composition of claim 1, wherein the elastomer is selected from the group consisting of synthetic gums, natural gums, synthetic elastomers, natural elastomers and mixtures thereof.

3. The gum base composition of claim 1, wherein the elastomer is present in an amount of about 2.5% to about 15% by weight.

4. The gum base composition of claim 1, wherein the polyvinyl acetate is present in an amount of about 8% to about 15% by weight.

5. The gum base composition of claim 1, wherein the composition additionally contains up to about 15% by weight of a polyvinyl acetate having a low molecular weight of about 12,000 to about 16,000.

6. The gum base composition of claim 5, wherein the low molecular weight polyvinyl acetate is present in an amount of about 12% to about 17% by weight.

7. The gum base composition of claim 1, wherein the composition additionally contains up to about 15% by weight of a polyvinyl acetate having a high molecular weight of about 65,000 to about 95,000.

8. The gum base composition of claim 7, wherein the composition contains about 2% to about 15% by weight high molecular weight polyvinyl acetate.

9. The gum base composition of claim 5 wherein the mole ratio of low molecular weight polyvinyl acetate to the medium molecular weight polyvinyl acetate is 1:0.5–1.5.

10. The gum base composition of claim 7 wherein the mole ratio of high molecular weight polyvinyl acetate to the medium molecular weight polyvinyl acetate is 1:0.5 to 1.5.

11. The gum base composition of claim 1, wherein the acetylated monoglyceride has a sponification value above about 400.

12. The gum base composition of claim 11 wherein the acetylated monoglyceride is present in an amount of about 5% to about 10%.

13. The gum base composition of claim 1 wherein the fat is selected from the group consisting of hydrogenated palm oil, hydrogenated soybean oil, hydrogenated vegetable oil, hydrogenated cotton seed oil and mixtures thereof.

14. The gum base composition of claim 13 wherein the fats are present in an amount of about 5% to about 12%.

15. The gum base composition of claim 1, wherein the filler is present in an amount of about 15% to about 40%.

16. The gum base composition of claim 1, wherein the fat is a material having a melting point between about 30° C. and 65° C.

17. The gum base composition of claim 1, wherein the elastomer solvent is present in an amount of about 2% to about 12% and wherein the elastomer solvent is selected from the group consisting of pentaerythritol ester of partially hydrogenated wood resin, glycerol ester of partially dimerized rosin, glycerol ester of tall oil rosin, glycerol ester of wood resin and partially hydrogenated wood rosin and partially hydrogenated methyl ester of resin; terpene resins including polyterpene and polymers of alpha-pinene or beta-pinene and mixtures thereof.

18. The composition of claim 17, wherein the elastomer solvent is present in an amount of about 7% to about 11%.

19. A chewing gum base composition, which consisting essentially of in weight percent:
 a) about 2.5% to about 25% elastomer;
 b) about 2% to about 12% elastomer solvent;
 c) about 8% to about 15% of a polyvinyl acetate having a medium molecular weight of about 35,000 to 55,000;
 d) about 6% to about 10.0% acetylated monoglyceride having a oponification value above about 400;
 e) about 5% to about 14% plasticizer;
 f) about 15% to about 40% filler; and
 g) about 6% to about 10% of a fat having a melting point below about 65° C.; all percents being by weight of the final gum base composition and are present to bring the weight of gum base to 100%.

20. A reduced calorie chewing gum composition having an enhanced hydrophilic nature when chewed, which comprises: a sweetening agent and about 40% to about 90% of a chewing gum base which consisting essentially of in weight percent:
 a) about 0.5% to about 30% elastomer;
 b) about 5% to about 40% of a polyvinyl acetate having a medium molecular weight of about 35,000 to about 55,000;
 c) about 4.5% to about 15.0% acetylated monoglyceride;
 d) about 6% to about 20% of a fat having a melting point below about 65° C.; and
 e) remaining amount of a filled material sufficient to bring the weight of gum base to 100%, wherein all percents of the base are by weight of the final gum base composition.

21. The chewing gum composition of claim 20, wherein the elastomer is selected from the group consisting of synthetic gums, natural gums, synthetic elastomers, natural elastomers and mixtures thereof.

22. The chewing gum composition of claim 20, wherein the elastomer is present in an amount of about 2.5% to about 15% by weight.

23. The chewing gum composition of claim 20, wherein the polyvinyl acetate is present in an amount of about 8% to about 15% by weight.

24. The chewing gum composition of claim 20, wherein the composition additionally contains up to about 15% by weight of a polyvinyl acetate having a low molecular weight of about 12,000 to about 16,000.

25. The chewing gum composition of claim 24 wherein the low molecular weight polyvinyl acetate is present in an amount of about 12% to about 17% by weight.

26. The chewing gum composition of claim 20, wherein the gum base composition additionally contains up to about 15% by weight of a polyvinylacetate having a high molecular weight of about 65,000 to about 95,000.

27. The chewing gum composition of claim 26, wherein the base composition contains about 2% to about 15% by weight high molecular weight polyvinyl acetate.

28. The chewing gum composition of claim 24 wherein the mole ratio of low molecular weight polyvinyl acetate to the medium molecular weight polyvinyl acetate is 1:0.5–1.5.

29. The chewing gum composition of claim 26 wherein the mole ratio of high molecular weight polyvinyl acetate to medium molecular weight polyvinyl acetate is 1:0.5 to 1.5.

30. The chewing gum composition of claim 20 wherein the acetylated monoglyceride has a sponification value above about 400.

31. The chewing gum composition of claim 30 wherein the acetylated monoglyceride is present in an amount of about 6% to about 10.0%.

32. The chewing gum composition of claim 20 wherein the fat is selected from the group consisting of hydrogenated palm oil, hydrogenated soybean oil, hydrogenated vegetable oil, hydrogenated cotton seed oil and mixtures thereof.

33. The chewing gum composition of claim 32 wherein the hydrogenated vegetable oil is present in an amount of about 5% to about 12.

34. The chewing gum composition of claim 20 wherein the filler is present in an amount of about 15% to about 40%.

35. The chewing gum composition of claim 32 wherein the fat is a material having a melting point between about 30° C. and 65° C.

36. The chewing gum composition of claim 20 wherein the elastomer solvent is present in an amount of about 2% to about 12% and wherein the elastomer solvent is selected from the group consisting of pentaerythritol ester of partially hydrogenated wood resin, glycerol ester of partially dimerized rosin, glycerol ester of polymerized rosin, glycerol ester of tall oil rosin, glycerol ester of wood resin and partially hydrogenated wood rosin and partially hydrogenated methyl ester of rosin; terpene resins including polyterpene and polymers of alpha-pinene or beta-pinene and mixtures thereof.

37. The chewing gum composition of claim 36, wherein the elastomer solvent is present in an amount of about 7% to about 11%.

38. The chewing gum composition of claim 20, wherein the sweetening agent is selected from the group consisting of water-soluble sweetening agents, water-soluble artificial sweeteners, dipeptide based sweeteners and mixtures thereof.

39. The chewing gum composition of claim 20, which additionally contains a flavoring agent.

40. The chewing gum composition of claim 39 wherein the flavoring agent is selected from the group consisting of peppermint oil, spearmint oil, cinnamon oil, oil of wintergreen, fruit flavors and mixtures thereof.

41. A confectionery coated chewing gum composition having a center portion and a confectionery coating over the center portion wherein the center portion consisting essentially of a reduced-calorie gum base which comprises in percentages by weight of the gum base:

(a) an elastomer present in an amount from about 0.5% to about 30%;
(b) a medium molecular weight polyvinyl acetate polymer having a molecular weight from about 35,000 to about 55,000 present in an amount from about 5% to about 40%;
(c) an acetylated monoglyceride present in an amount from about 4.5% to about 15%;
(d) a fat having a melting point below about 65° C. present in an amount from about 6% to about 20%; and
(e) a filler component, present in an amount to bring the total amount of gum base to 100%.

42. The confectionery coated chewing gum composition according to claim 41, wherein the center portion is present in an amount from about 25% to about 95%, by weight of the gum composition.

43. The gum base composition of claim 41, wherein the elastomer is selected from the group consisting of synthetic gums, natural gums, synthetic elastomers, natural elastomers and mixtures thereof.

44. The gum base composition of claim 41, wherein the elastomer is present in an amount of about 2.5% to about 15% by weight.

45. The gum base composition of claim 41, wherein the polyvinyl acetate is present in an amount of about 8% to about 15% by weight.

46. The gum base composition of claim 41, wherein the composition additionally contains up to bout 15% by weight of a polyvinyl acetate having a low molecular weight of about 12,000 to about 16,000.

47. The gum base composition of claim 46, wherein the low molecular weight polyvinyl acetate is present in an amount of about 12% to about 17% by weight.

48. The gum base composition of claim 41, wherein the composition additionally contains up to about 15% by weight of a polyvinyl acetate having a high molecular weight of about 65,000 to about 95,000.

49. The gum base composition of claim 48, wherein the composition contains about 2% to about 15% by weight high molecular weight polyvinyl acetate.

50. The gum base composition of claim 46 wherein the mole ratio of low molecular weight polyvinyl acetate to the medium molecular weight polyvinyl acetate is 1:0.5–1.5.

51. The gum base composition of claim 48 wherein the mole ratio of high molecular weight polyvinyl acetate to the medium molecular weight polyvinyl acetate is 1:0.5 to 1.5.

52. The gum base composition of claim 41, wherein the acetylated monoglyceride has a sponification value above about 400.

53. The gum base composition of claim 52 wherein the acetylated monoglyceride is present in an amount of about 6% to about 10%.

54. The gum base composition of claim 41 wherein the fat is selected from the group consisting of hydrogenated palm oil, hydrogenated soybean oil, hydrogenated vegetable oil, hydrogenated cotton seed oil and mixtures thereof.

55. The gum base composition of claim 54 wherein the fats are present in an amount of about 5% to about 12%.

56. The gum base composition of claim 41, wherein the filler is present in an amount of about 15% to about 40%.

57. The gum base composition of claim 41, wherein the fat is a material having a melting point between about 30° C. and 65° C.

58. The gum base composition of claim 41, wherein the elastomer solvent is present in an amount of about 2% to about 12% and wherein the elastomer solvent is selected from the group consisting of pentaerythritol ester of partially hydrogenated wood resin, glycerol ester of partially dimerized rosin, glycerol ester of tall oil rosin, glycerol ester of wood resin and partially hydrogenated wood resin and partially hydrogenated methyl ester of resin; terpene resins including polyterpene and polymers of alpha-pinene or beta-pinene and mixtures thereof.

59. The composition of claim 58, wherein the elastomer solvent is present in an amount of about 7% to about 11%.

60. A method for preparing a confectionery coated chewing gum composition of claim 41 having a center portion and a confectionery coating over the center portion which comprises coating the center portion with the confectionery coating, wherein the center portion comprises a gum base having an enhanced hydrophilic nature.

61. A method for preparing a confectionery coated chewing gum composition of claim 41 having a center portion and a confectionery coating over the center portion which comprises coating the center portion with the confectionery coating, wherein the center portion comprises a chewing gum composition comprising:
(a) a gum base having an enhanced hydrophilic nature present in an amount from about 40% to about 75%, by weight of the chewing gum composition; and
(b) a bulking agent present in an amount up to about 60%, by weight of the chewing gum composition.

62. A chewing gum composition capable of releasing increased amounts of flavor over a long release time using conventional flavor levels comprising:
(a) a gum base according to claim 1 present in an amount of from about 40% to about 90% by weight;
(b) a carbohydrate component present in an amount of from about 7% to about 45% by weight; and
(c) a flavor component present in an amount of up to about 4% by weight.

63. The chewing gum composition of claim 62, wherein said gum base is present in an amount of from about 60% to about 70% by weight.

64. The chewing gum composition of claim 62, wherein said carbohydrate component is present in an amount of from about 10% to about 30% by weight.

65. The chewing gum composition of claim 62, wherein said flavor component is present in an amount of from about 0.05% to about 3% by weight.

66. The chewing gum composition of claim 62 wherein said flavor component is present in an amount of from about 0.8% to about 1.5% by weight.

67. The chewing gum composition of claim 63 wherein the flavor component is selected from the group consisting of flavors derived from essential oils, artificial fruit flavors, natural fruit flavors, bean-derived flavors, nut-derived flavors, and mixtures thereof.

68. The chewing gum composition of claim 62 wherein said flavor is selected from the group consisting of cinnamon oil, spearmint oil, peppermint oil, oil of wintergreen, birch, anise, apple, pear, grape, peach, strawberry, cherry, apricot, orange, watermelon, banana, coffee, cocoa, cola, peanut, almond, and mixtures thereof.

* * * * *